United States Patent
Fondriest et al.

(10) Patent No.: US 9,669,485 B2
(45) Date of Patent: Jun. 6, 2017

(54) METHOD FOR WELDING A CASE HARDENED COMPONENT

(71) Applicant: Whirlpool Corporation, Benton Harbor, MI (US)

(72) Inventors: Daniel L. Fondriest, Norwalk, OH (US); Kurt Werner, Saint Joseph, MI (US); Richard J. Widman, Bellevue, OH (US); Luke J. Wilkins, Stevensville, MI (US); Steven J. Flick, Fremont, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 307 days.

(21) Appl. No.: 13/974,125

(22) Filed: Aug. 23, 2013

(65) Prior Publication Data

US 2015/0053310 A1 Feb. 26, 2015

(51) Int. Cl.
| | |
|---|---|
| *B23K 9/173* | (2006.01) |
| *B23K 35/30* | (2006.01) |
| *B23K 9/23* | (2006.01) |
| *B23K 9/235* | (2006.01) |
| *B23K 35/28* | (2006.01) |
| *C23C 8/50* | (2006.01) |
| *C23C 8/80* | (2006.01) |
| *B23K 103/04* | (2006.01) |

(52) U.S. Cl.
CPC ............ *B23K 9/173* (2013.01); *B23K 9/23* (2013.01); *B23K 9/235* (2013.01); *B23K 35/286* (2013.01); *B23K 35/302* (2013.01); *C23C 8/50* (2013.01); *C23C 8/80* (2013.01); *B23K 2203/04* (2013.01)

(58) Field of Classification Search
CPC .............................. B23K 9/173; B23K 35/302
See application file for complete search history.

(56) References Cited

U.S. PATENT DOCUMENTS

| | | | |
|---|---|---|---|
| 5,707,460 | A | 1/1998 | Chaterjee |
| 7,637,128 | B2 | 12/2009 | Kim |
| 8,382,632 | B2 | 2/2013 | Segawa et al. |

FOREIGN PATENT DOCUMENTS

DE 3429994 C1 4/1985

OTHER PUBLICATIONS

Hongping Gua*, Guobin Yinb and Boris Shulkina, Laser Beam Welding of Nitride Steel Components, Science Direct, Physics Procedia 12 (2011) p. 40-45 LiM 2011 Available online at www.sciencedirect.com Published by Elsevier LTD.
Laser Welding a Pratical Guide, Christopher Dawes, CEng, Abington Publishing, Woodhead Publishing Ltd in association with The Welding Institute Cambridge England, first published 1992, 6 pages.

*Primary Examiner* — Rebecca Lee

(57) ABSTRACT

A method for producing a welded part from two components, where at least one of the components has a hardened surface. The method can include case hardening the surface of one of the components using a salt bath nitriding process and then welding the case hardened first component to the second component by gas metal arc welding (GMAW).

8 Claims, 5 Drawing Sheets

METHOD FOR WELDING A CASE HARDENED COMPONENT

BACKGROUND OF THE INVENTION

Some home appliances, such as washing machines, use processes to harden the surface of components for increased wear and/or corrosion resistance. Salt bath nitriding is one example of a process by which a case hardened surface can be created on a component.

Whirlpool has used salt bath nitriding on the spin tube of the gear case on some washing machines to increase the corrosion resistance of the spin tube, which is exposed to wash liquid during operation of the washing machine. The spin tube, which is made of cold-rolled steel, is welded in place before nitriding because the prior art had established that nitrided parts cannot be successfully welded. Welding a nitrided component may lead to an unacceptable level of porosity in the weld. DE3429994 teaches that after salt bath nitriding, surfaces are no longer weldable. The textbook, *Laser Welding: a Practical Guide* confirms that nitrided surfaces are generally unsuitable for fusion welding processes, since the weld will remove the surface hardness in the vicinity of the weld.

BRIEF DESCRIPTION OF THE INVENTION

According to one aspect of the invention, a method for producing a welded part comprising a first component welded to a second component includes case hardening the surface of the first component by a salt bath nitriding process, and welding the case hardened first component to the second component by a gas metal arc welding process using an aluminum-bronze wire electrode, wherein the weld between the first and second components is substantially free of porosity and the surface hardness of the first component in the vicinity of the weld is substantially undiminished.

According to another aspect of the invention, an appliance comprises a case hardened first component welded to a second component, wherein the first component is case hardened by a salt bath nitriding process prior to welding the case hardened first component to the second component by a gas metal arc welding process using an aluminum-bronze wire electrode. The weld between the first and second components is substantially free of porosity and the surface hardness of the first component in the vicinity of the weld is substantially undiminished.

DESCRIPTION OF EMBODIMENTS OF THE INVENTION

According to one aspect of the invention, an appliance can be provided with at least one welded assembly, where at least one component of the welded assembly can be subjected to a salt bath nitriding process prior to welding. One example of a welded assembly that can be produced using the method of the invention is a spin tube and gear case of a clothes washing machine. However, the method of the invention can be used to produce other welded assemblies for appliances in which it would be beneficial to case harden at least one of the components of the assembly prior to welding.

Figure 1:
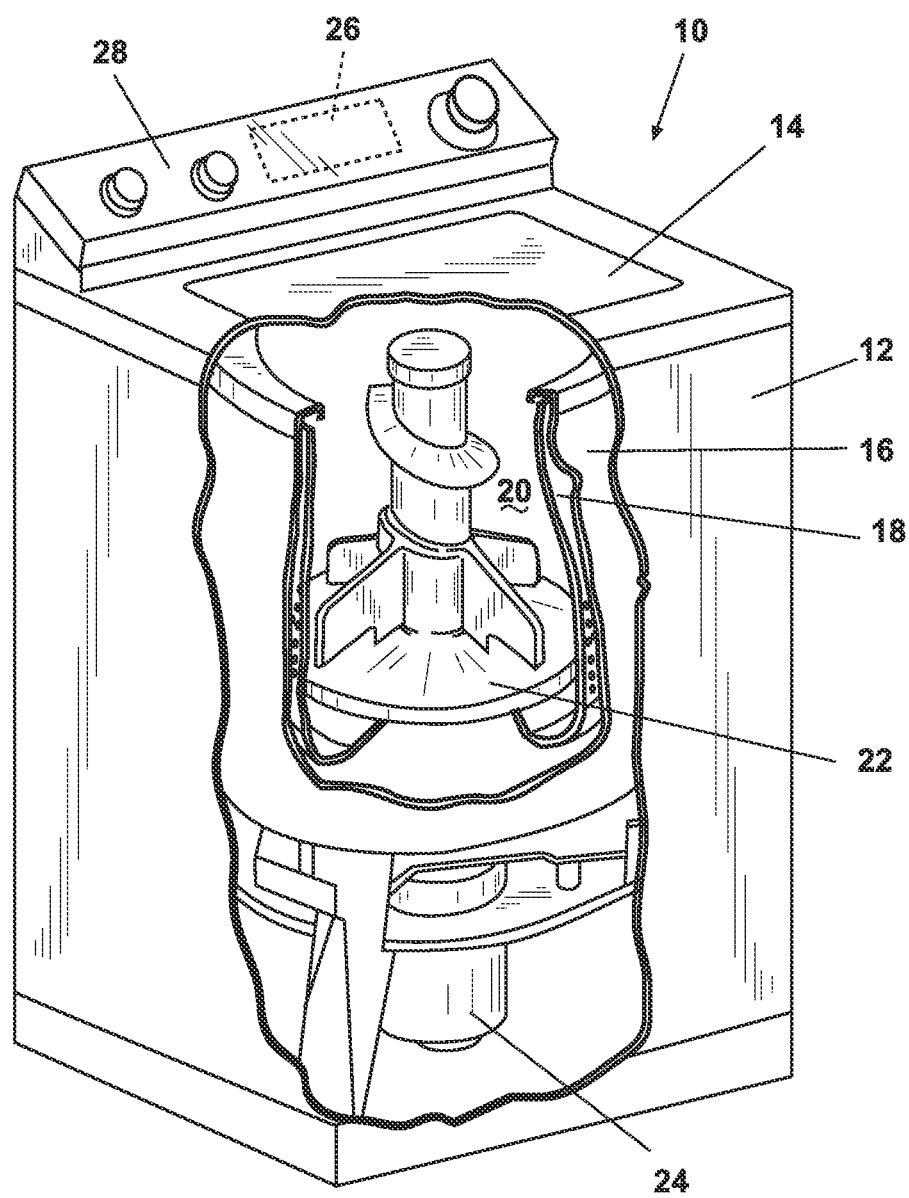
FIG. 1 is a perspective partially cutaway view of an appliance according to a first embodiment of the invention.

FIG. 1 illustrates an exemplary appliance in the form of a vertical axis washing machine 10 that may comprise an open top cabinet 12 closable by a hinged lid 14. The cabinet 12 may house a stationary, imperforate, open top wash tub 16. A perforated, open top drum 18 may be rotatably mounted inside the wash tub 16 and define a laundry treating chamber 20 having a rotatable clothes mover 22 mounted therein, as is generally known in the washing machine art. Rotation of the clothes mover 22 and the drum 18 may be driven by a motor 24 disposed within the cabinet 12 below the wash tub 16, operably coupled to a controller 26. The controller 26 may communicate with a control panel 28 through which a user may select a desired automatic wash cycle.

A typical wash cycle may comprise at least a wash step to wash the clothes load with wash liquid, a rinse step to rinse the wash liquid from the clothes load with water, and a spin step to extract excess rinse water from the clothes load. During the wash and rinse steps, the clothes mover 22 may oscillate and rotate relative to the drum 18 to move the clothes load and/or liquid within the treating chamber 20. During the spin step, both the clothes mover 22 and the drum 18 may typically rotate at high speeds in a selected direction to extract excess water from the fabric items. Depending on the type of wash cycle selected by a user through the control panel 28, the clothes load may be subjected to combinations and numbers of wash, rinse, and spin steps.

Figure 2:
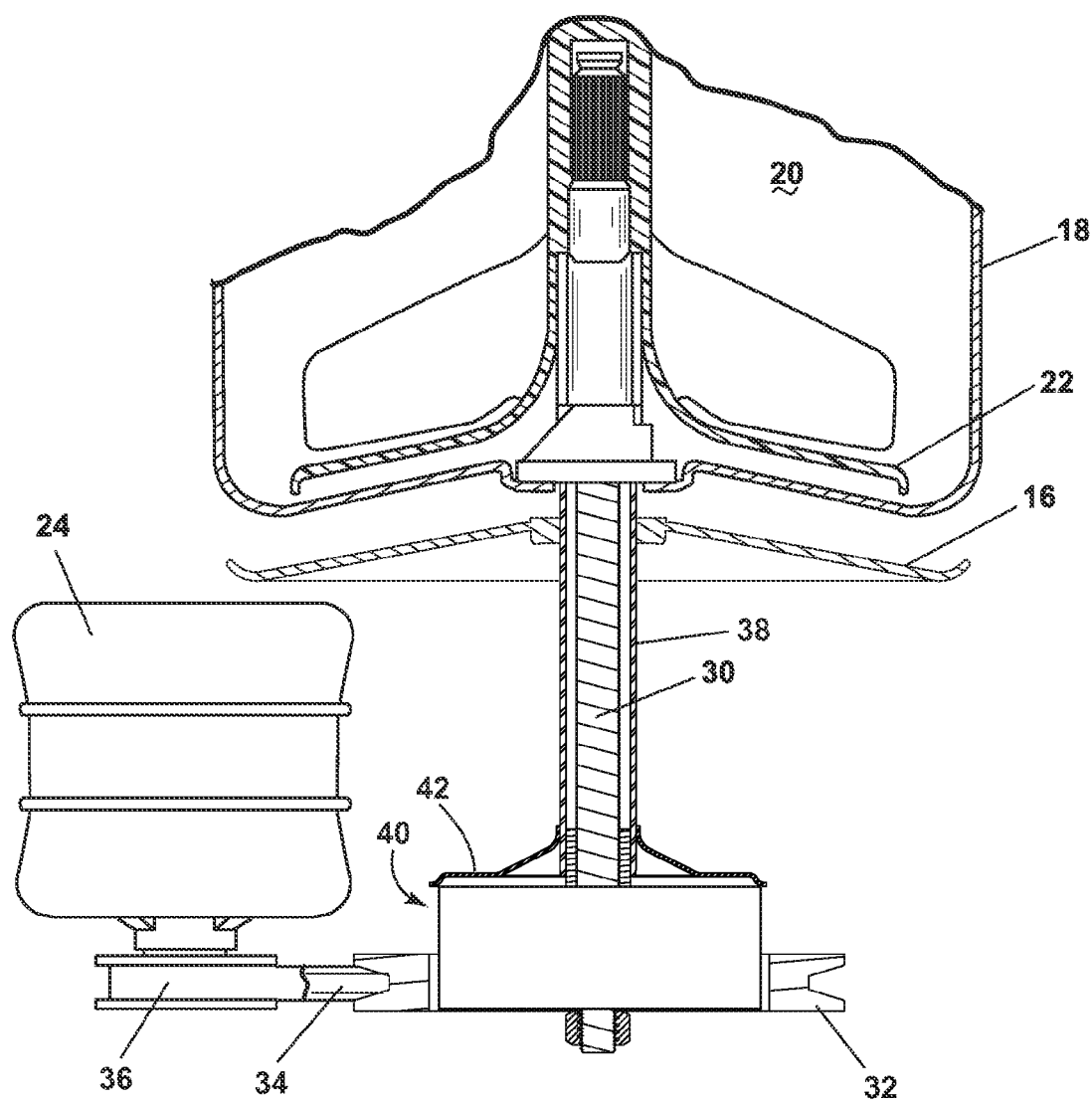
FIG. 2 is a partial sectional view of the drive portion of the washing machine of FIG. 1.

Referring to FIG. 2, the motor 24 is coupled to the clothes mover 22 through an agitator shaft 30 having an upper end fixedly mounted to the clothes mover 22 and a lower end mounted to a pulley 32 driven by a belt 34 that rotates around a drive wheel 36 affixed to a reversibly rotatable motor shaft (not shown), as is well known in the washing machine art.

A generally hollow spin tube 38 according to the illustrated embodiment of the invention surrounds the agitator shaft 30 such that the agitator shaft 30 can rotate relative to the spin tube 38. The drum 18 is fixedly attached to the spin tube 38 and is selectively mechanically coupled to the agitator shaft 30 via a clutch assembly (not shown) in a gear case 40. The spin tube 38 can be welded to the top of the gear case 40. As shown herein, the bottom of the spin tube 38 is welded to a gear case cover 42 to define a welded assembly 44.

Figure 4:
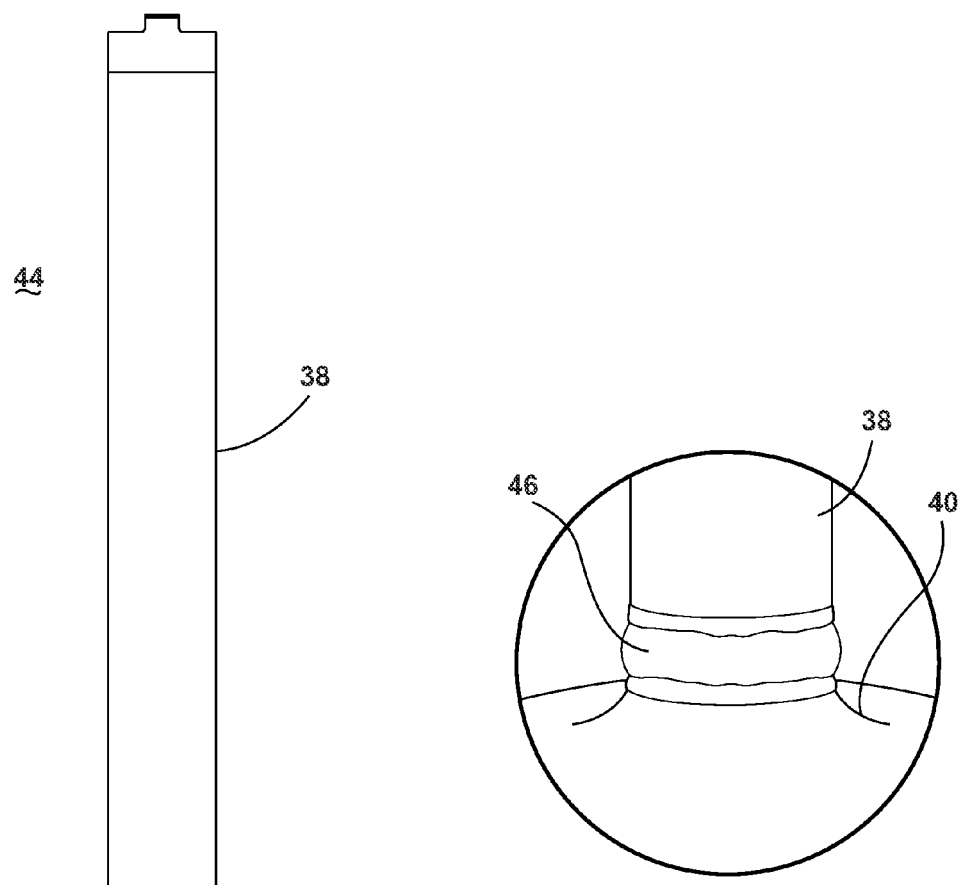
FIG. 4 is a close-up view of section IV of the welded assembly from FIG. 3.
Figure 3:
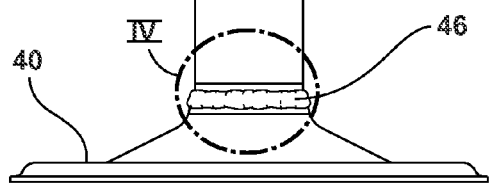
FIG. 3 is a side view of a welded assembly of the appliance from FIG. 1.

FIGS. 3-4 is a side view and close-up view of the welded assembly 44 of the appliance from FIG. 2 including the spin tube 38 and gear case cover 42, which are joined at a weld joint 46. The spin tube 38 is formed from metal, preferably steel, and can have a case hardened surface produced by salt bath nitriding, such that nitrogen and carbon are diffused into the surface of the metal. The gear case cover 42 is also formed from metal, preferably steel, and can be welded to the spin tube 38 after the salt bath nitriding process. As such, the gear case cover 42 does not have a case hardened surface.

Figure 5:
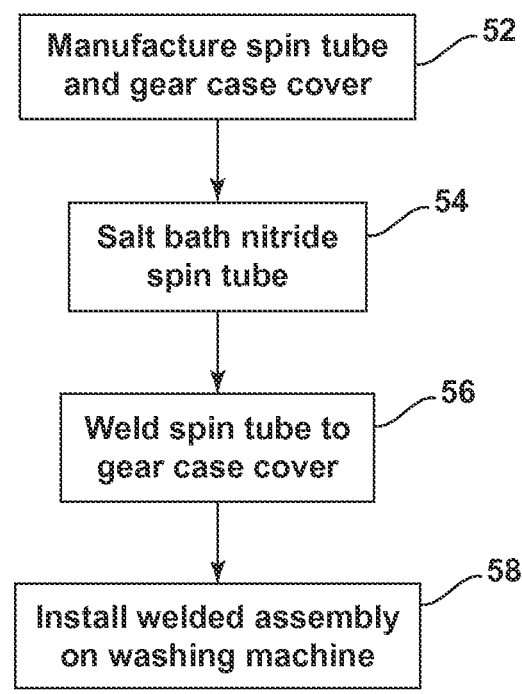
FIG. 5 is a flow chart illustrating a method for producing the welded assembly from FIG. 3.

FIG. 5 is a flow chart illustrating a method 50 for producing the welded assembly 44 from FIG. 3. While discussed in terms of the spin tube 38 and gear case cover 42, the method can be applied to produce other welded assemblies for appliances in which it would be beneficial to case harden at least one of the components of the assembly prior to welding. The first step 52 in the method is manufacturing the spin tube 38 and gear case cover 42 for the assembly 44. Processes for manufacturing spin tubes and gear case covers are well-known in the art, and will not be described in detail herein. Briefly, the spin tube 38 and gear case cover 42 can be machined with features for attachment to the drum 18 and gear case 40; for example, the spin tube 38 and gear case cover 42 can be stamped and finished by grinding. Next, the spin tube 38 undergoes a salt bath nitriding process at step 54. Briefly, the spin tube 38 is dipped into a salt bath tank containing a nitrogen donating medium and nitrogen diffuses into the surface of the metal spin tube 38 to case harden the surface. At step 56, the case hardened spin tube 38 is welded to the gear case cover 42 using gas metal arc welding (GMAW). In preparation for the welding step 56, the spin tube 38 and/or gear case cover 42 may be cleaned mechanically or chemically. The spin tube 38 and gear case cover 42 are joined at weld joint 46, which is substantially free of weld porosity, having extremely low, often near zero, porosity, and the surface hardness of the spin tube 38 in the vicinity of the weld joint 46 is substantially undiminished from its level after the salt bath nitriding step 54. Finally, the welded assembly 44 can be installed on the washing machine 10 at step 58.

Figure 6:
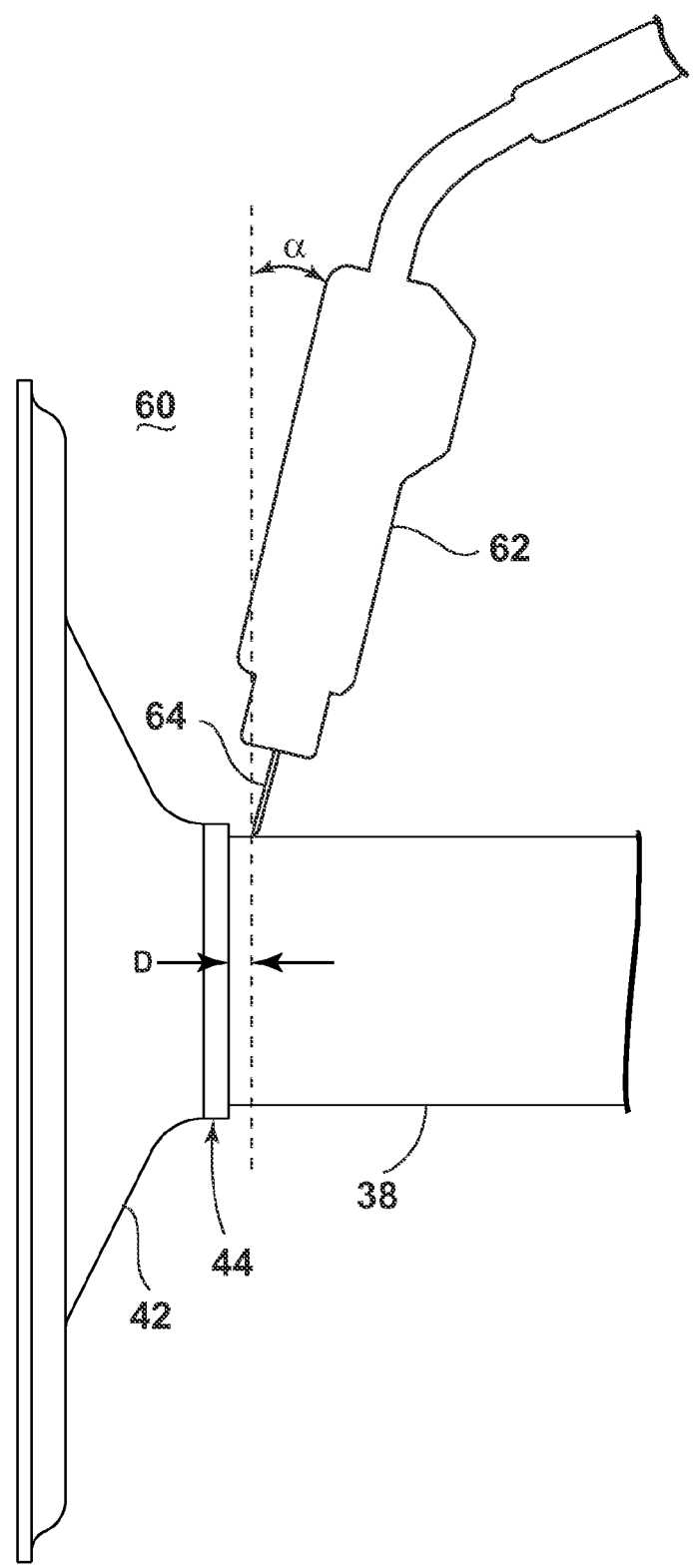
FIG. 6 is a schematic view of a gas metal arc welding process for producing the welded assembly from FIG. 3.

FIG. 6 is a schematic view of a GMAW process 60 for producing the welded assembly from FIG. 3. After salt bath nitriding, the spin tube 38 is partially inserted into the gear case cover 42 and a welding gun 62 is used to create an arc between a solid wire electrode 64 and the assembly 44. The solid wire electrode 64 melts to create a weld pool and becomes the filler material for the weld joint. A pulsed-spray transfer mode can be used to deposit the filler material in a spray of small droplets. As the weld pool reaches the proper width, the assembly 44 is rotated relative to the stationary welding gun 62 until the end of the weld is reached. More than one pass around the assembly 44 may be required; for example, a slight overlap of the weld may be required, such as an overlap of approximately 10°. The centerline of the assembly 44 may be oriented along an approximately horizontal axis, with the welding gun 62 fixed at a distance d of approximately 2 mm from the top of the gear case cover 42 and held an angle α of approximately 15° from normal (i.e. vertical) to the outer surface of the spin tube 38. During welding, a shielding gas flows through the welding gun 62 to protect the welding area from atmospheric gases. One example of a suitable shielding gas is argon.

The solid wire electrode 64 used as filler material is an aluminum-bronze alloy, the bronze itself being an alloy of copper and tin. The aluminum-bronze alloy is also corrosion resistant. One specific example of a suitable aluminum-bronze alloy is Luvaweld® SG-CuAl8, available from Luvata, which has a diameter of 1.0 mm.

While many of the variables of the welding process 60 can be modified to suit the particular components to be welded, one specific set of variables for the welding process 60 is set forth in the table below.

| | |
|---|---|
| Gear Case Cover | 0.9 mm Galvanized Steel |
| Spin Tube | 2.4 mm Nitrided Steel |
| Electrode Wire | 1.0 mm Luvaweld ® SG-CuAl8 (Aluminum Bronze) |
| Electrode Extension (mm) | 15 |
| Shielding Gas | 100% Argon |

-continued

| | |
|---|---|
| Shielding Gas Flow Rate (CFH) | 35 |
| Programmed Current (A) | 125 |
| Arc Tune | 40 |
| Actual Current (A) | 176 |
| Voltage (V) | 17 |
| Travel Speed (ipm) | 60 |
| RPM | 15.0 |
| Approx. Weld Time (seconds) | 4.3 |
| Approx. Wire Consumption | 20" measured during welding |

There are several advantages of the present disclosure arising from the various features of the apparatuses described herein. For example, the embodiment of the invention described above allows for a robust weld between two components, where at least one of the components has already been nitrided. Nitrided spin tubes have previously been used on some washing machines, but these spin tubes had to be welded in place before nitriding, since conventional thinking in the art is that nitrided parts cannot be successfully welded. Welding before nitriding is expensive because the entire welded assembly has to be dipped into the salt bath tank, even though only a portion of the welded assembly requires a case hardened surface.

Previous attempts to weld nitride surfaces were unsuccessful. After salt bath nitriding, a hardened surface of black oxide is created. This black oxide surface makes welding a problem. The black oxide surface causes contamination in the weld joint and the formation of unacceptable porosity in the weld.

The present invention allows nitrided components to be welded using a GMAW process. The combination of high speed GMAW and the aluminum-bronze filler material makes it possible to weld on the black oxide surface created by salt bath nitriding. The resulting weld joint is robust and has extremely low, often near zero, porosity. This process allows nitriding to be completed before welding, thereby limiting nitriding to only those components that require it. Since the parts are smaller, larger batches can be nitrided at a time, further reducing costs and manufacturing time.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An appliance comprising:
   a case hardened first component welded to a second component;
   wherein the first component is case hardened by a salt bath nitriding process prior to welding the case hardened first component to the second component by a gas metal arc welding process using an aluminum-bronze wire electrode; and
   wherein the weld between the first and second components is substantially free of porosity and the surface hardness of the first component in the vicinity of the weld is substantially undiminished.

2. The appliance of claim 1, wherein the gas metal arc welding process comprises using a shielding gas comprising argon.

3. The appliance of claim 1, wherein the first component comprises steel.

4. The appliance of claim 3, wherein the second component comprises steel.

5. The appliance of claim 1, and further comprising at least one of grinding and stamping the first component prior to case hardening the surface of the first component.

6. The appliance of claim 1, wherein the first component comprises a spin tube and the second component comprises a gear case cover.

7. The appliance of claim 1, wherein the appliance comprises a clothes washing machine.

8. An appliance comprising:
- a case hardened first component welded to an unnitrided second component;
- wherein the first component is case hardened by a salt bath nitriding process prior to welding the case hardened first component to the unnitrided second component by a gas metal arc welding process using an aluminum-bronze wire electrode; and
- wherein the weld between the case hardened first component and the unnitrided second component is substantially free of porosity and the surface hardness of the first component in the vicinity of the weld is substantially undiminished.

* * * * *